United States Patent [19]

Slessor

[11] 3,794,367

[45] Feb. 26, 1974

[54] ELASTOMERIC ENERGY ABSORBER
[75] Inventor: John M. Slessor, Northville, Mich.
[73] Assignee: Ford Motor Company, Dearborn, Mich.
[22] Filed: July 21, 1972
[21] Appl. No.: 273,881

[52] U.S. Cl. .............................. 293/88, 267/63 A
[51] Int. Cl. ............................................. B60r 19/06
[58] Field of Search ..... 293/DIG. 2, DIG. 5, 85, 86, 293/88, 89; 267/63 A, 140, 141; 213/8, 40

[56] References Cited
UNITED STATES PATENTS
3,722,939   3/1973   Church et al. .................... 267/63 A
2,508,347   5/1950   Marsh ................................. 293/85

Primary Examiner—Robert J. Spar
Assistant Examiner—Robert Saifer
Attorney, Agent, or Firm—John J. Roethel; Keith L. Zerschling

[57] ABSTRACT

The energy absorbing support device comprises a ram attached to and particularly adapted to support the impact bar of a vehicle bumper system. The ram is telescopically received in an outer casing adapted to be supported on a vehicle frame member. Elastomeric puck members bonded to the case and ram yieldably position the ram within the case. A wedge plate is welded internally to the case and has wedging engagement with the ram to prevent withdrawal of the latter from the case and vibration within the case. The energy of an impact on the bumper or impact bar is transmitted through the ram to the puck members and is absorbed or controlled by the elongation (stretch) of the pucks.

7 Claims, 4 Drawing Figures

PATENTED FEB 26 1974

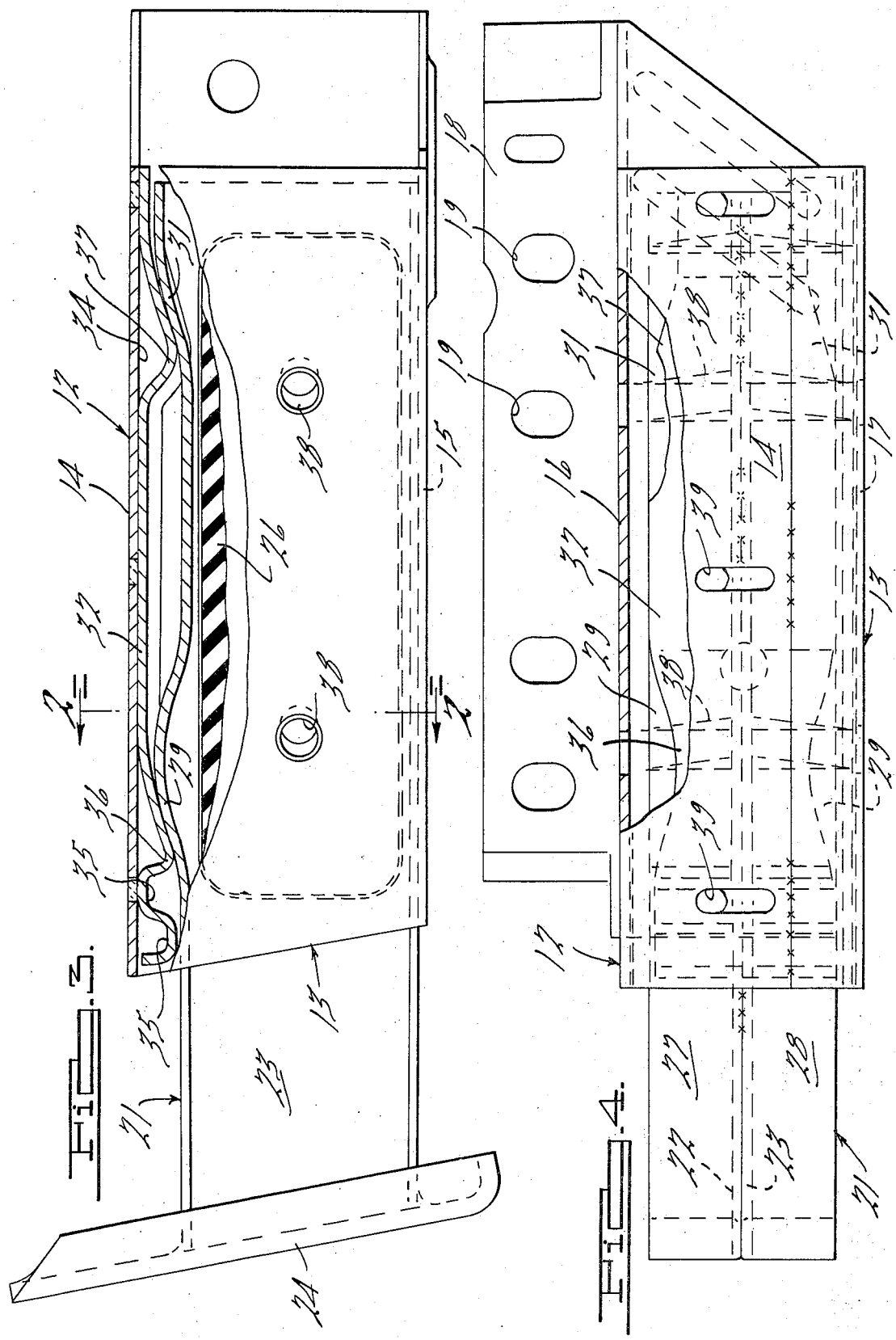

3,794,367

ELASTOMERIC ENERGY ABSORBER

BACKGROUND OF THE INVENTION

The use of elastomeric energy absorption devices in vehicle bumpers is not a new concept. Mr. P. B. Lindley of the Natural Rubber Producers' Research Association, England, authored an article entitled "Automobile Anti-Impact Bumpers of Natural Rubber" that appeared in the Society of Automotive Engineers Journal in December 1970. Mr. Lindley in his article demonstrated that bonded natural rubber units are able to convert the kinetic energy of a vehicle upon impact into deformation work.

This principle earlier had been recognized in British Pat. No. 551,334, accepted Feb. 17, 1943 and issued to Rubber Bonders Limited. The patent was entitled "Improvements in and Relating to Bumpers for Motor Vehicles." The primary object of the patent was to provide improved means for absorbing impact whereby more satisfactory protection is afforded to that part of the vehicle to which the bumper is applied.

According to the patent, a bumper may be connected to the frame of a motor vehicle through the medium of resilient material, for example rubber, in such a manner that the resilient material will be subjected to shear stress in absorbing impact.

It has been found, however, that in order to achieve a functional bumper system more is required than merely supporting the bumper support arms on resilient material devices. The bumper of a modern vehicle is frequently used as a hookup member for the tow chain of a towing vehicle. The bumper is also used in conjunction with a jack when it is desired to raise the vehicle so that a tire can be changed. It is also necessary to insure that the bumper system does not vibrate when the vehicle is being driven over the roadway.

Accordingly, it is an object of the present invention to utilize the basic concept of connecting a bumper system to the frame of a motor vehicle through the medium of resilient material in such a manner that the resilient material will be subjected to shear stress in absorbing impact but that under all other conditions the bumper will be rigidly supported on the vehicle so that it can be used for towing and jacking purposes and so that it will be vibration free.

SUMMARY OF THE INVENTION

The present invention relates to an energy absorbing support device particularly adapted to support a bumper or the impact bar of a vehicle bumper system on a vehicle frame. The support device comprises a ram having an I-shaped cross section and an outer case telescopically receiving the ram. The outer case is adapted to be supported on a vehicle frame member. Elastomeric puck members bonded to the case and ram yieldably position the latter within the case. The puck members are constructed and arranged to elongate under impact movement of the ram to absorb the energy of impact on a vehicle bumper.

An important feature of the present invention comprises a wedge plate welded to the case and having wedging engagement with the ram to prevent withdrawal of the latter from the case and vibration within the case. During assembly of the support device, the wedge plate and ram are positioned to place a pre-load on the puck members.

The method of making an energy absorbing support device according to the present invention includes forming an elongated casing member having substantially parallel upper and lower walls and substantially parallel side walls and forming a substantially I-shaped ram with ramp means on at least one flange. Elastomeric members are positioned on each side of the web of the I-shaped ram. A wedge means is positioned on the one flange in proximate relation to the ramp means. The elastomeric members and the wedge means are inserted with the ram into the casing to a predetermined depth and are then subjected to a curing action to bond the elastomeric members to the I-shaped ram web inside walls of the casing. After the curing is completed, pressure is applied to the end of the ram to force the same into the casing beyond the predetermined depth to preload the bonded elastomeric members. With the ram held in the elastomeric members preloading position, the wedge is positioned and secured to the casing in abutting relation to the ramp means. After the wedge means is secured, the force holding the ram in elastomeric member preloaded position is released so that the elastomeric members will urge the ram outwardly of the casing whereby the wedge means and ramp means are adapted to be maintained in abutting relation.

DESCRIPTION OF THE DRAWINGS

Further features and advantages of the present invention will be made more apparent as this description proceeds, reference being had to the accompanying drawings, wherein:

FIG. 3 is a side elevation of the support device with parts of the view cut away to illustrate the internal relationship of the parts of the structure, and FIG. 4 is a plan view similarly having parts cut away to expose the internal structure.

DETAILED DESCRIPTION OF THE INVENTION

Figure 1:
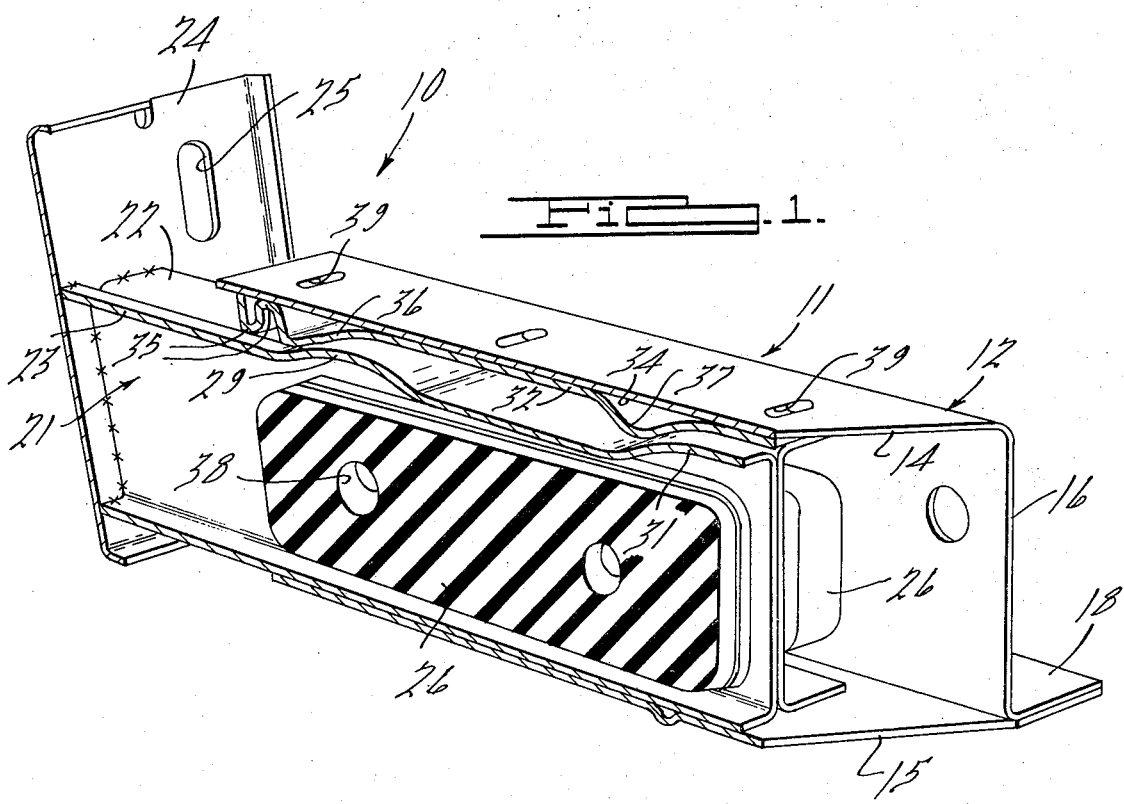
FIG. 1 is a perspective cut-away view of the energy absorbing support device embodying the present invention.

Referring now to the drawings, the reference numeral 10 designates, in general, an energy absorbing device adapted to be used for supporting an impact bar or bumper on the frame of a vehicle. The energy absorbing support device 10 comprises an elongated housing or casing 11 which is illustrated as being fabricated of two substantially right angle metal sections or stampings 12 and 13. When the sections 12 and 13 are assembled, they provide a substantially square housing or casing having upper and lower parallel walls 14 and 15 and parallel side walls 16 and 17. The casing 11 is provided with a flange 18 along one side, the flange 18 having a plurality of apertures 19 adapted to receive bolts (not shown) for securing the casing 11 to a vehicle frame.

Figure 2:
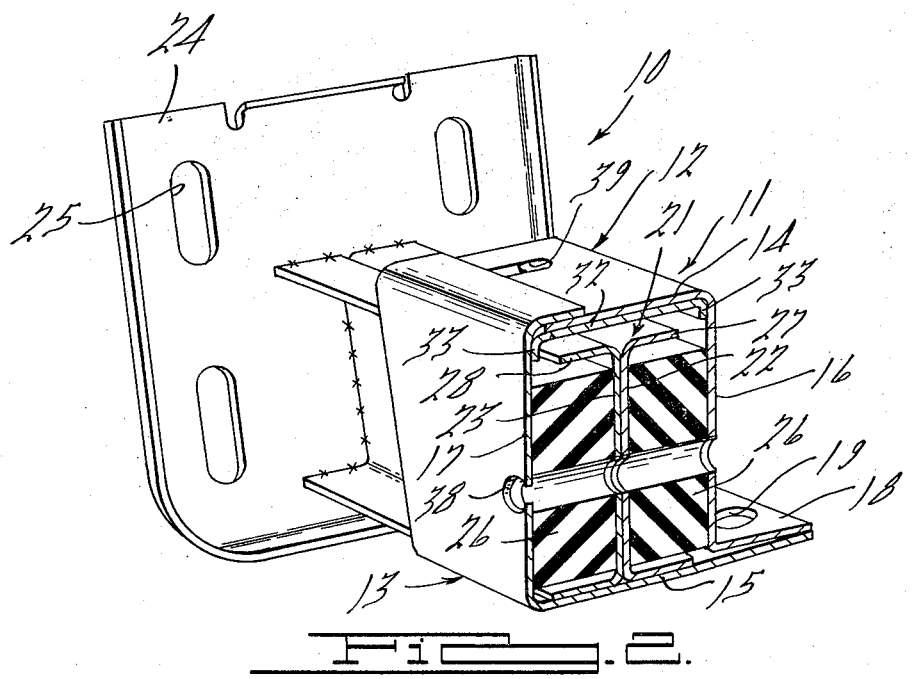
FIG. 2 is a perspective vertical cross section of the support device taken on the line 2—2 of FIG. 3.

A ram, generally designated 21, is in part telescopically received within the housing or casing 11. The ram 21 is substantially I-shaped in cross section, see FIG. 2. It is illustrated as being fabricated of two channel sections 22 and 23 that are welded to each other in back to back relationship. Welded to what would be the front end of the ram 21 when the energy absorbing device is mounted on a vehicle frame is a face plate 24 having bolt holes or slots 25 adapted to receive bolts (not shown) for securing the vehicle impact or bumper bar assembly (not shown).

Interposed between the part of ram 21 telescoped within the housing or casing 11 and the walls of the casing are a pair of elastomeric members 26. In the preferred form the elastomeric members comprise elongated natural rubber pucks of rectangular cross section. These are installed on the two sides of the I-beam or ram 21 filling both of the channel sections 22 and 23, respectively. The pucks 26 are applied under 10 percent compression and are retained by an adhesive during preassembly. After insertion of the I-beam 21 and pucks 26 into the housing or casing 11, the pucks are vulcanized to the I-beam and to the inner sides of the case in a 300° F oven where the rubber is heated to 265° F. The vulcanizing produces an intermolecular bond between the rubber and steel. This is similar to the vulcanization of rubber to steel in engine mounts The natural rubber for the pucks 26 preferably is compounded to provide 400 percent stretch and normal recovery. This means that a puck 1.5 inches thick can stretch 6.00 inches, a substantial distance in excess of the stroke and stretch requirements necessary to meet the requirements for 1973 model vehicles.

As best seen in FIGS. 1 and 3, the upper flanges 27 and 28 of the I-beam or ram 21 channel sections 22 and 23, respectively, are formed with front and rear curved ramps 29 and 31. Interposed between the upper flanges 27 and 28 is an elongated wedge plate 32. The wedge plate 32 has downwardly turned flanges 33 on each longitudinal edge and fits beneath the upper surface 34 of the housing or casing 11. The wedge plate 32 has laterally extending reinforcing ribs 35 on its front end and has a pair of longitudinally spaced arcuate ramps 36 and 37 adapted to coact with the respective ramps 29 and 31 on the flanges 27 and 28 of the I-beam or ram 21. As best seen in FIG. 3, the effective length of the wedge plate 32 and the effective length of the respective ramps 29-31 on the I-beam flanges are substantially coextensive with the length of the elastomeric members or pucks 26 when the energy absorbing support is at an at rest or nonimpact condition.

The wedge plate 32 has several functions as will be explained following a brief description of a method of making an energy supporting device 10 in accordance with the present invention. As stated, the housing or casing 11 comprises two substantially right angle metal sections or stampings 12 and 13 which are welded together to form the elongated housing or casing.

The I-beam or ram 21 comprises a pair of channel sections 22 and 23 welded together in back to back relationship. The elastomeric members or rubber pucks 26 are positioned on each side of the I-beam or ram 21 and fill up the channel sections 22 and 23. The elastomeric members 26 prior to being vulcanized may be held in place with an adhesive.

The assembly of the device 10 involves the telescopic insertion of the ram 21 into the housing. Immediately before this is done, however, the wedge plate 32 is loosely positioned on top of the I-beam or ram 21 with its ramp portions 36-37 abutting the ram 21 ramp portions 29-31.

The ram 21 with the elastomeric members 26 and wedge plate 32 are slidably inserted into the housing or casing 11 to a predetermined depth. It will be noted that the housing, elastomeric members 26 and I-beam or ram 21 have a plurality of holes 38 extending therethrough. These holes are utilized to locate and align the parts during the assembly operation, the assembly being done in a suitable jig or fixture to properly align and hold the parts until they are secured together. With the parts properly aligned, the whole unit is inserted into an oven and, as explained, is subjected to a 300° F temperature which heats the elastomeric members 26 to 265° F. At this approximate temperature a vulcanizing action takes place and the rubber pucks or elastomeric members are vulcanized to the I-beam and to the inner sides of the case. The vulcanizing produces an intermolecular bond between the rubber and steel so that any forces exerted on the end of the ram will place the rubber pucks in shear causing deformation with energy absorption characteristics.

After the bonding of the elastomeric members or rubber pucks 26 is completed, the ram is forced further into the casing beyond the position in which it was held during the bonding operation. This functions to preload the bonded elastomeric members so that they will have a tendency to drive the ram out of the casing to the extent of the preload. Before releasing the parts from the preloading force, the wedge 32 is forced into tight relationship with the upper surface of the I-beam or ram 21. When the proper wedging action has been achieved between the coacting ramp portions of the wedge and the ramp portions of the I-beam or ram 21 flanges, the wedge is welded securely to the upper wall 14 of the housing or casing. It will be noted in FIG. 4 that the upper wall 14 of the housing or casing 11 is provided with a series of slots through which molten weld material may be poured in a process known as puddle welding. After the parts have been securely fastened to each other, the force on the ram 21 placing the preload on to the pucks 26 is removed. The pucks 26 remain under the preloaded condition because the wedge holds the ram against outward movement relative to the housing or casing 11.

In achieving the preload on the elastomeric members 26 for a unit of the type disclosed, a 500 psi force is placed on the ram to cause the preload deformation on the elastomeric members. As noted earlier, the elastomeric members are placed under a 10 percent compression in the assembly process.

The foregoing construction and arrangement, particularly in the utilization of the wedge plate 32, provides several advantages. First, the wedge resists withdrawal of the ram 21 from the housing 11. This is necessary if it is desired to use the bumper system of the vehicle in towing the vehicle. For all practical purposes, the energy absorbing device in the pull-out direction is a rigid structure because of the relationship of the wedge plate 32 ramp portions 36 and 37 to the ramp surfaces 29 and 31 on the ram 21.

Another important function of the wedge and its reinforcing ribs 35 is to provide for forces exerted on a vehicle bumper during jacking operations. Without the wedging action between the casing and the ram 21, a substantial amount of jacking movement would occur without any lift on the vehicle until the upper surface of the ram 21 abutted the under surface 34 of the housing. With the wedge in place there is no clearance to permit such movement.

It has also been found that in rubber in shear energy absorbing systems harmonic vibrations occur which causes the bumper system to vibrate relative to the vehicle frame. Through the wedging action of the wedge plate 32 between the casing 11 and ram 21, such vibration is prevented.

From the foregoing, it becomes readily apparent that the only direction in which the ram 21 is free to move under a load or impact is in a direction deeper into the housing or casing 11. That is, any impact force exerted on the face plate 24 results in elastomeric deformation of the elastomeric members or rubber pucks 26 as the ram moves deeper into the housing. It has long been recognized that bonded natural rubber units are able to convert the kinetic energy of a vehicle upon impact into deformation work. Accordingly, the deformation of the elastomeric members or rubber pucks 26 permits absorption of the energy of impact within the limits of movement permitted in the vehicle bumper system. Upon release of the impacting force, the energy absorbing device is self-restoring substantially to its original position where it may be utilized again should the occasion arise.

It is to be understood that the invention is not limited to the exact construction illustrated and described above, but that various changes and modifications may be made without departing from the spirit and scope of the invention as defined by the following claims:

I claim:

1. An energy absorbing support device for an impact bar comprising:
    a horizontally extending elongated housing having at least one open end,
    the housing being of substantially rectangular cross section with horizontal and vertical pairs of opposed side walls,
    a ram in part telescopically received within the housing through the open end in slidable engagement with one of the horizontal walls and spaced from the other horizontal wall,
    the ram having impact bar support means at an end thereof outside of the housing,
    longitudinally extending elastomeric members located on opposite sides of the ram within the housing,
    the elastomeric members being bonded to opposed side surfaces of the ram and the vertical walls of the housing,
    wedge means located in the space between the ram and the other horizontal wall of the housing,
    and ramp means on the ram normally in engagement with the wedge means to prevent withdrawal of the ram from the housing open end and also vibratory movement substantially normal to the direction of telescopic movement of the ram,
    the ramp means and wedge means when in normal engagement with each other being substantially longitudinally coextensive with the elastomeric members,
    the ram at all times being further telescopically movable into the housing in response to an impact force on an impact bar supported thereon to effect elastic deformation of the elastomeric members and thereby absorption of the energy of the impact force.

2. An energy absorbing support device according to claim 1, in which:
    the elastomeric members are preloaded in a direction to maintain the ramp means on the ram in abutting relation to the wedge means under nonimpact force conditions.

3. An energy absorbing support device according to claim 2, in which:
    the ram comprises an I-beam having a web connecting parallel flanges,
    the plane of the web extending in a vertical direction,
    and the elastomeric members are bonded to opposite side surfaces of the web and project outwardly of the I-beam flanges into bonded engagement with the vertical side walls of the housing.

4. An energy absorbing device according to claim 3, in which:
    one flange of the I-beam provides the slidable engagement with the one housing horizontal wall and the other flange is in spaced relationship to the other housing horizontal wall,
    the one flange of the I-beam is formed to provide the ram means.

5. An energy absorbing support device according to claim 1, in which:
    The ram comprises an I-beam having a vertically extending web and substantially horizontal flanges paralleling the horizontal housing walls,
    and the elastomeric members are bonded to opposite side surfaces of the web and project outwardly of the I-beam flanges into bonded engagement with the vertical side walls of the housing.

6. An energy absorbing device according to claim 1, in which:
    the ram comprises an I-beam having a vertically extending web and an upper and a lower flange substantially paralleling the horizontal housing walls,
    and the elastomeric members are bonded to opposite side surfaces of the web and project outwardly of the I-beam flanges into engagement with the vertical walls of the housing.

7. An energy absorbing device according to claim 6, in which:
    the lower flange of the I-beam provides the slidable engagement with the one housing horizontal wall and the upper flange is in spaced relationship to the other horizontal wall,
    the upper flange being formed to provide the ramp means.

* * * * *